Aug. 2, 1938.   J. F. GOGGIN   2,125,780

METHOD OF AND MEANS FOR PRODUCING LUMINOUS EFFECTS

Filed Feb. 20, 1936

J. F. GOGGIN   INVENTOR.

BY Merrill M. Blackburn.
ATTORNEY

Patented Aug. 2, 1938

2,125,780

UNITED STATES PATENT OFFICE 2,125,780

METHOD OF AND MEANS FOR PRODUCING LUMINOUS EFFECTS

Jeremiah F. Goggin, Davenport, Iowa

Application February 20, 1936, Serial No. 64,991

2 Claims. (Cl. 40—134)

The present invention relates to the producing of what may be described as luminous or shadow effects, and may be applied in many ways. I have chosen to illustrate its application in only one of these various ways, and this illustration must therefore be regarded merely as typical.

Among the various objects of this invention are the provision of means for the production of novel light effects; the provision of means for producing interesting and entertaining luminous effects; the provision of a novel method of entertaining; and such further objects, advantages, and capabilities as will hereafter appear and as are inherent in the structure and method herein disclosed. My invention further resides in the combination, construction, and arrangement of parts illustrated in the accompanying drawing and their equivalents and, while I have disclosed herein an apparatus for producing the desired effect, I desire the same to be understood as illustrative only and not to be interpreted in a limiting sense.

In the drawing annexed hereto and forming a part hereof,

Figures 1, 2:
Fig. 1 represents a face view of an apparatus for carrying out the method described herein.
Fig. 2 represents a cross section substantially along the plane indicated by the broken line 2—2, Fig. 1.

Reference will now be made in greater detail to the annexed drawing for a more complete disclosure of this invention. In the annexed drawing, there is represented a frame 1 having mounted therein a plane sheet 2 of opaque or transparent material, coated on one or both faces with luminescent material comprising as its active ingredient a luminous alkaline earth sulphide, selenide, telluride, or zinc sulphide. The active material is preferably finely pulverized and suspended in a quick drying liquid carrier, such as banana oil. This may be sprayed or spread upon the supporting member, such as, for example, paper, cardboard, or glass. While the above description may be inferred as implying that the supporting element 2 is flat, it should be understood that this is not necessarily true, as this element may be variously curved or otherwise formed.

In order to protect and keep clean the luminescent surface 3 of the supporting body 2, a sheet of glass may be placed in the frame 1 before inserting the support 2, and this will prevent contamination by dust and dirt in the air, on the hands of the users, or elsewhere. It has been indicated above that the support 2 may be made of glass. This may be clear, colored, translucent, or opaque. Also, it is to be understood that after a surface of the glass has been coated with the luminescent material, another sheet of glass may be placed over the coated side and cemented to the base 2 around the edges of the glass, thus forming a unitary structure, permanent in nature, barring breakage of the glass.

In front of the luminescent surface, I have shown an object 4, variously referred to herein as a picture, symbol, character, stencil, or shield, the word "object" being intended as a generic term to cover all of these. In this specification and the appended claims, the term "vibrational energy" is used to indicate any form of vibrational energy capable of activating the luminescent material to produce the results specified. The term "luminescent material" is intended to cover any substance of the type specified above which is capable of producing the results indicated.

In use, it is preferable to erase from the luminescent material all traces of any prior images. This is done by exposing the luminescent surface to sunlight or a bright light with no object between the source of vibrational energy and the luminescent surface. The luminescent material is then permitted to rest in the presence of less intense vibrational energy so as to recover its power of being activated. When it has reached this condition, it is ready for use again and an object is then placed in front of the luminescent surface, as illustrated in the drawing, and then exposed to the action of vibrational energy, such as light or heat. The object, itself, casts a shadow upon the luminescent surface so that only that part of the luminescent material which is directly exposed to the activating action of the vibrational energy becomes sharply activated and brilliant in reaction. It will of course be understood that the closer the object is to the luminescent material the sharper will be the outline of the shadow cast.

It will of course be understood that the specific description of structure and method set forth above may be departed from without departing from the spirit of this invention as set forth in the appended claims.

Having now described my invention, I claim:

1. An article of manufacture comprising a supporting member having a surface bearing luminescent material to be activated by vibrational energy, a frame in which said supporting member is mounted, and a shield of tangible material in proximity to the surface bearing the luminescent material and serving to shield the luminescent material from the vibrational energy, whereby to cause said material to have the appearance, when exposed in the dark, with the shield removed from the vicinity of said material, of having a shadow thereon, the shield being free of any connection with the frame or supporting member.

2. An article of manufacture comprising a supporting member having a surface bearing luminescent material to be activated by vibrational energy, in combination with a picture, symbol, character, object, or the like, in contact with the luminescent material and serving as a shield to shield, in part, the luminescent material from the vibrational energy, whereby to cause said material to have the appearance, when exposed in the dark and with the picture, symbol, or the like, removed, of having a shadow thereon, said picture, symbol, or the like, being free of any connection with the supporting member.

JEREMIAH F. GOGGIN.